US007542278B2

(12) United States Patent
Liu et al.

(10) Patent No.: US 7,542,278 B2
(45) Date of Patent: Jun. 2, 2009

(54) ELECTRONIC APPARATUS INCORPORATING FIXING MECHANISM

(75) Inventors: Zhi-Gang Liu, Shenzhen (CN); Zhi-Gang Chen, Shenzhen (CN); Ke-Cheng Lin, Tucheng (TW); Chien-Li Tsai, Tucheng (TW); Jie Zhang, Shenzhen (CN); Wen-Kang Lo, Tucheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 298 days.

(21) Appl. No.: 11/308,634

(22) Filed: Apr. 14, 2006

(65) Prior Publication Data

US 2006/0232924 A1    Oct. 19, 2006

(30) Foreign Application Priority Data

Apr. 15, 2005    (CN)    ......................... 2005 2 0057330

(51) Int. Cl.
  *H05K 5/00*    (2006.01)
  *H05K 7/00*    (2006.01)
  *G06F 1/16*    (2006.01)
(52) U.S. Cl. ..................................... 361/685
(58) Field of Classification Search ................. 361/683, 361/685
  See application file for complete search history.

(56) References Cited

U.S. PATENT DOCUMENTS 5,398,157 A * 3/1995 Paul ........................... 361/684
5,680,293 A * 10/1997 McAnally et al. ............ 361/685
5,841,631 A * 11/1998 Shin et al. .................... 361/684
6,262,883 B1 * 7/2001 Kim ............................ 361/680
6,297,951 B1 * 10/2001 Lee ............................. 361/685
6,469,900 B2 * 10/2002 Cheng ......................... 361/726
6,590,848 B1 * 7/2003 Chen ........................... 720/654
6,606,241 B2 * 8/2003 Moore ......................... 361/685
6,657,868 B1 * 12/2003 Hsue ........................... 361/728
6,785,141 B2 * 8/2004 Fang ........................... 361/727
6,826,045 B2 * 11/2004 Chen ........................... 361/685
6,900,984 B2 * 5/2005 Merz et al. .................. 361/687
6,924,976 B2 * 8/2005 Wang et al. ................. 361/685
6,980,430 B2 * 12/2005 Su .............................. 361/685
7,009,836 B2 * 3/2006 Lo ............................. 361/683
7,072,178 B2 * 7/2006 Chen et al. .................. 361/685

FOREIGN PATENT DOCUMENTS

TW    221956    10/2004

* cited by examiner

*Primary Examiner*—Anatoly Vortman
*Assistant Examiner*—Quinn Hunter
(74) *Attorney, Agent, or Firm*—Wei Te Chung

(57) ABSTRACT

An electronic apparatus includes a base (30). A rigid rail (321) is arranged to the base. An elastic portion (3231) is arranged to the base facing the rail. A fixing member (38) includes a first engaging portion (383) movable in the base in a first direction. A component (50) is movably received in the elastic portion and the rail in a second direction different from the first direction. A second engaging portion (513) is arranged to the component. The first engaging portion of the fixing member disengageably engages the second engaging portion to fix the component. A sliding member (36) is engageable with the fixing member and movable in the first direction to drive the first engaging portion of the fixing member to disengage from the second engaging portion.

13 Claims, 5 Drawing Sheets

ELECTRONIC APPARATUS INCORPORATING FIXING MECHANISM

FIELD OF THE INVENTION

The present invention relates to an electronic apparatus, and more particularly to an electronic apparatus having a component fixing mechanism.

DESCRIPTION OF RELATED ART

A portable electronic apparatus such as a notebook computer, laptop computer and the like, usually include storage devices, such as hard disk drives, compact disc read-only memory (CD-ROM) drives, digital video disc (DVD) drives, floppy disk drives, and the like. These storage devices are typically added to increase the functionality of the electronic apparatus as desired by a user.

Storage devices are typically attached in the electronic apparatus by screws. However, attachment with screws is unduly complicated and time consuming. In addition, a tool is usually required for installation and removal of the screws.

What is desired, therefore, is an electronic apparatus having a component fixing mechanism which facilitates removal and attachment of component thereof.

SUMMARY OF INVENTION

An electronic apparatus includes a base, a rigid rail arranged to the base, an elastic portion arranged to the base facing the rail; a fixing member having a first engaging portion movable in the base in a first direction; a component movably received between the elastic portion and the rail in a second direction different from the first direction, the elastic portion abutting against the component; a second engaging portion arranged to the component, the first engaging portion of the fixing member disengageably engaging the second engaging portion; and a sliding member engageable with the fixing member and movable in the first direction to drive the first engaging portion of the fixing member to disengage from the second engaging portion.

Other advantages and novel features will become more apparent from the following detailed description of a preferred embodiment when taken in conjunction with the accompanying drawings, in which:

DETAILED DESCRIPTION

Figure 1:
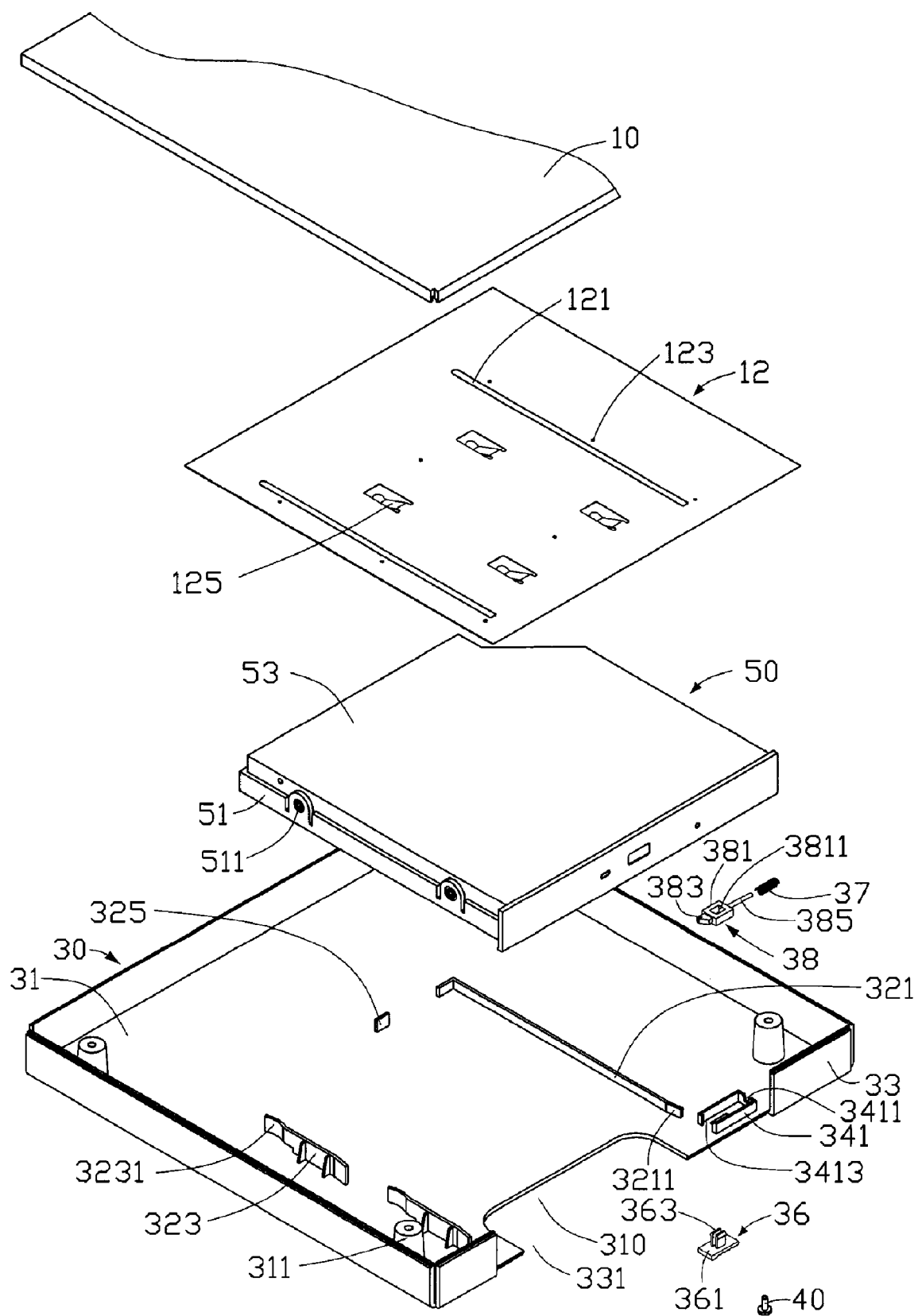
FIG. 1 is an exploded, isometric view of an electronic apparatus in accordance with a preferred embodiment of the present invention, the electronic apparatus including a cover, a base and a storage device.
Figure 2:
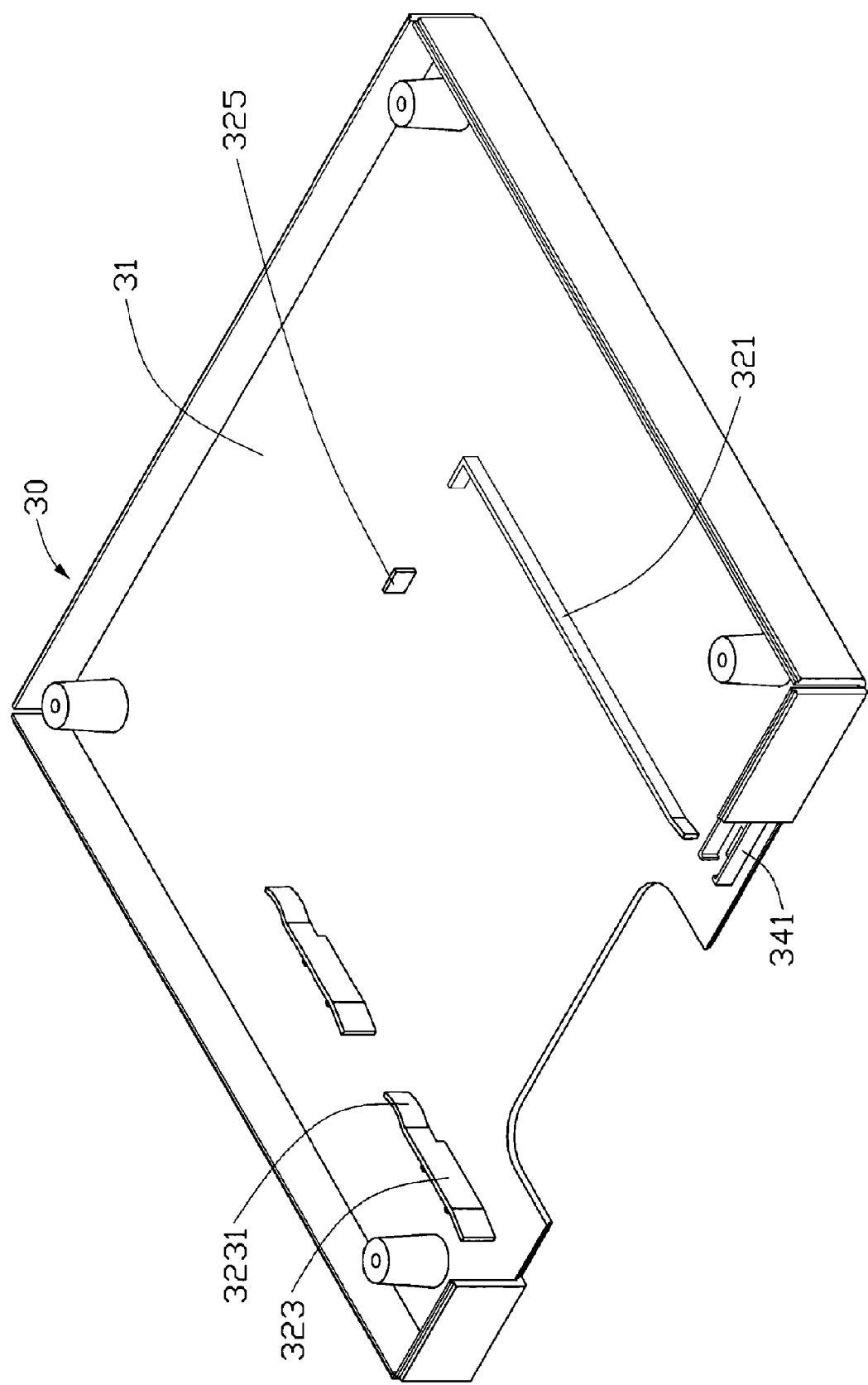
FIG. 2 is an isometric view of the base of FIG. 1, but viewed from another aspect.
Figure 3:
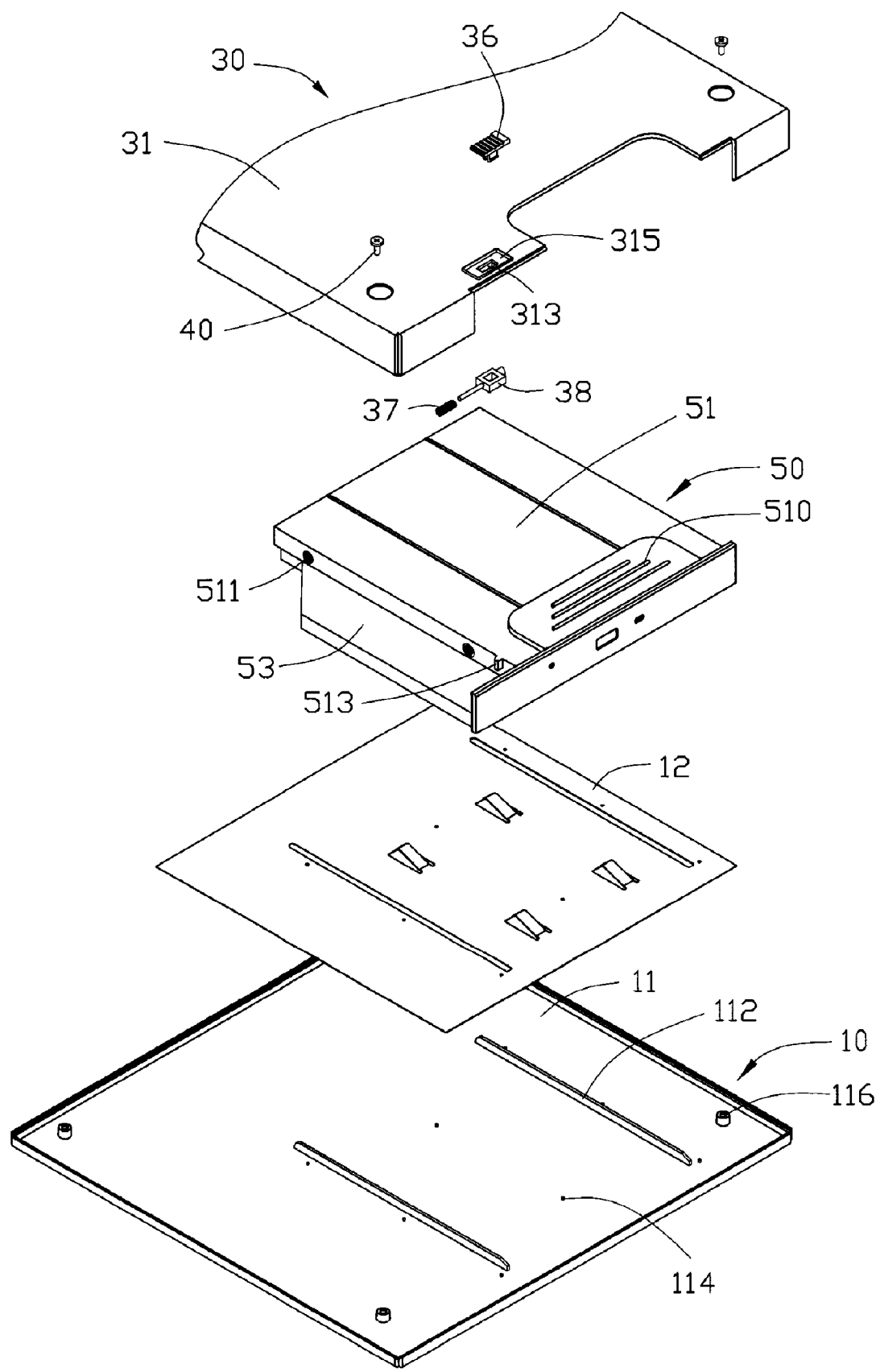
FIG. 3 is similar to FIG. 1, but viewed from another aspect.

Referring to FIGS. 1 to 3, an electronic apparatus includes a cover 10, a base 30 and a storage module 50.

The cover 10 includes a planar plate 11. A pair of parallel longitudinal ribs 112 depends from the plate 11. A plurality of protrusions 114 is formed on the plate 11. Four sockets 116 are formed on four corners respectively of the plate 11.

A shielding plate 12 is provided to be attached to the plate 11. A pair of slots 121 is defined in the shielding plate 12, corresponding to the ribs 112. A plurality of holes 123 is defined in the shielding plate 12, corresponding to the protrusions 114. A plurality of spring fingers 125 is punched downwardly from the shielding plate 12.

The base 30 includes a planar bottom wall 31 and a sidewall 33. An entrance 331 is defined in the sidewall 33, corresponding to the storage module 50. A cutout 310 is defined in the bottom wall 31 in communication with the entrance 331. Four projections 311 are formed on the bottom wall 31, corresponding to the sockets 116. Four screws 40 are provided to attach the base 30 to the cover 10. A generally L-shaped rigid rail 321 is formed on the bottom wall 31. A guiding portion 3211 is bent outwardly from a proximate end of the rail 321 adjacent the entrance 331. A pair of aligned clasps 323 is formed on the bottom wall 31 opposing the rail 321. Each clasp 323 ends with a cantilevered arcuate elastic portion 3231. A tab 325 is formed on the bottom wall 31 by aligning with a distal end of the rail 321 and facing the entrance 331. A receptacle 341 is formed on the bottom wall 31 adjacent the entrance 331. A gap 3411 is formed in an end wall of the receptacle 341, and an opening 3413 is defined in the receptacle 341 opposite to the end wall. A through hole 313 is defined in the bottom wall 31 at the receptacle 341, and a concave portion 315 is formed at a bottom surface of the bottom wall 31 surrounding the through hole 313.

A fixing member 38 is provided to fix the storage module 50. The fixing member 38 includes a body 381 capable of being received in the receptacle 341. An aperture 3811 is defined in the body 381. A first engaging portion 383 protrudes from an end of the body 381, corresponding to the opening 3413 of the receptacle 341. The first engaging portion 383 defines a slanted surface. A rod 385 extends from an opposite end of the body 381, corresponding to the gap 3411 of the receptacle 341. An elastic member 37, for example, a coil spring, is provided to cooperate with the fixing member 38.

A sliding member 36 is provided to attach the fixing member 38 in the receptacle 341. The sliding member 36 includes a base portion 361 for being received in the concave portion 315 of the base 30 and a pair of elastic hooks 363 for engaging the body 381 of the fixing member 38.

The storage module 50 includes a retainer 51. A plurality of screws 511 is provided to attach a slim optical disc drive 53 in the retainer 51. It can be understood that the slim optical disc drive 53 can be replaced with other storage device, for example a hard disk drive or a standard optical disc drive. The retainer 51 forms a grip portion 510 on a bottom surface thereof. A second engaging portion 513 protrudes outwardly from a lateral side of the retainer 51. The second engaging portion 513 defines a slanted surface, corresponding to the slanted surface of the first engaging portion 383 of the fixing member 30.

Figure 4:
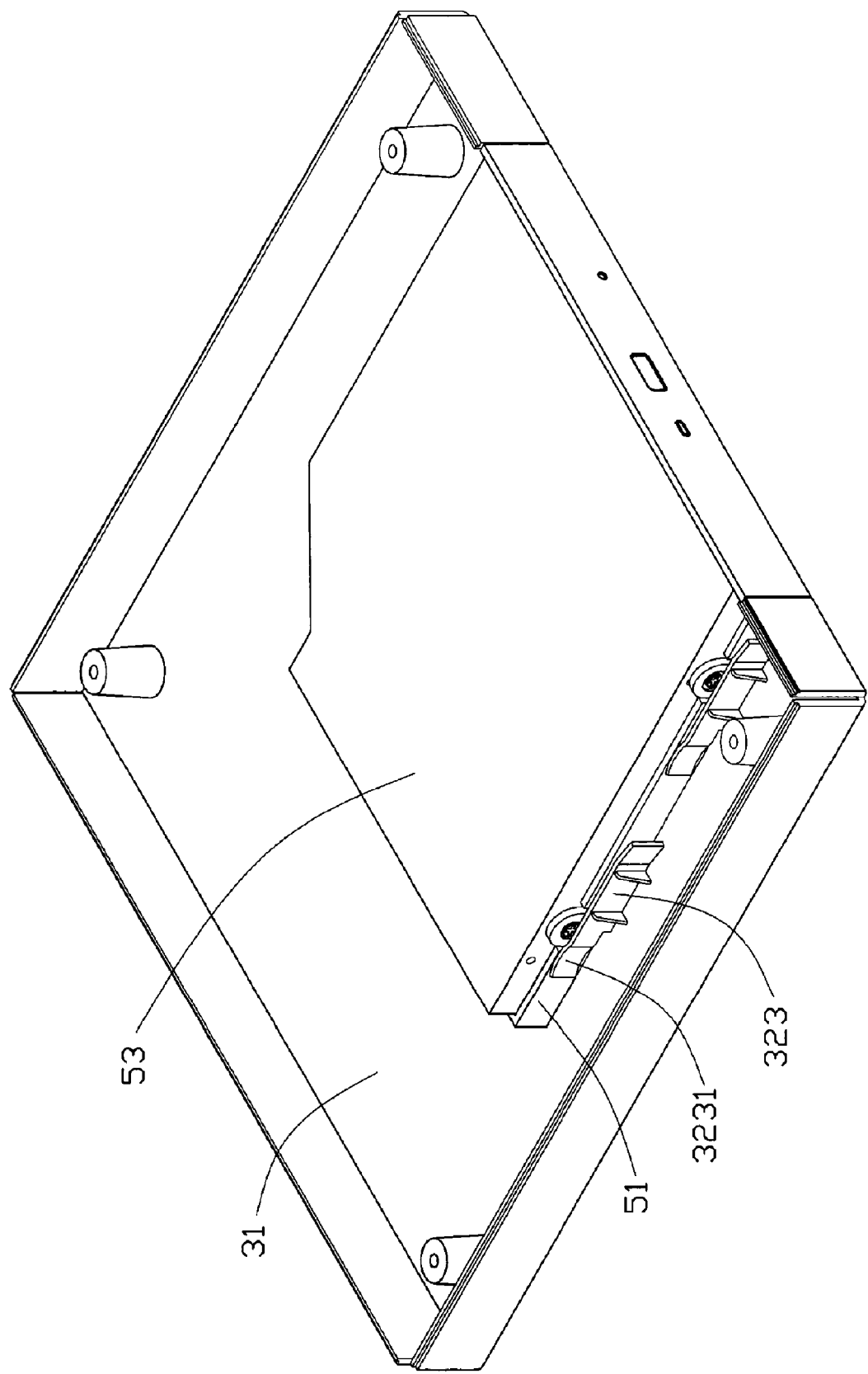
FIG. 4 is an assembled view of the base and the storage device of FIG. 1.
Figure 5:
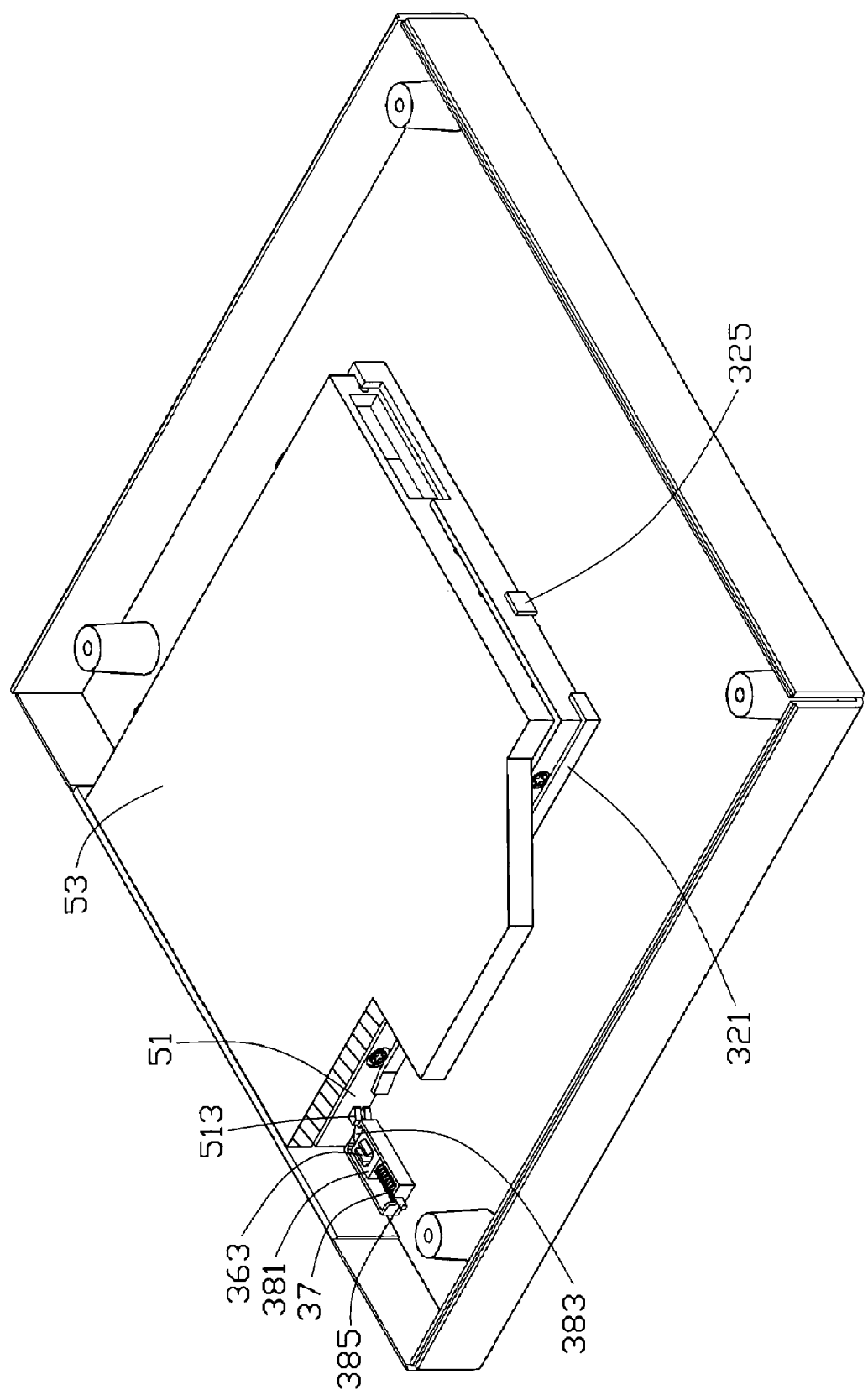
FIG. 5 is similar to FIG. 4, but viewed from another aspect.

Referring to FIGS. 4 and 5, in assembly, the rod 385 of the fixing member 38 is extended through the elastic member 37. The body 381 of the fixing member 38 and the elastic member 37 are both placed in the receptacle 341 of the base 30. The first engaging portion 383 of the fixing member 38 extends out from the opening 3413 of the receptacle 341, and the rod 385 of the fixing member 38 extends out from the gap 3411 of the receptacle 341. The hooks 363 of the sliding member 36 are inserted through the through hole 313 and the aperture 3811 of the body 381 of the fixing member 38 to catch the body 381. The base portion 361 of the sliding member 36 is received in the concave portion 315 of the base 30.

The shielding plate 12 is positioned to the cover 10, with the ribs 112 of the cover 10 extending through the slots 121 of the shielding plate 12 respectively. The protrusions 114 of the cover 10 extend through the holes 123 respectively of the shielding plate 12 for securing the shielding plate 12 to the cover 10 via hot melt technology. The screws 40 are extended through the projections 311 of the base 30 and engaged in the sockets 116 of the cover 10, thereby securing the cover 10 to the base 30.

In use, the storage module 50 is inserted in the base 30 via the entrance 331. Opposite sides of the optical disc drive 53 abut against the ribs 112 of the cover 10. Opposite lateral sides of the retainer 51 engage the rail 321 and the clasp 323 adjacent the entrance 331 respectively. The storage module 50 is pushed inwardly, and the second engaging portion 513 of the retainer 51 urges against the first engaging portion 383 of the fixing member 38. The first engaging portion 383 is pushed inward the receptacle 341 of the base 30. The elastic member 37 is compressed. When the second engaging portion 513 of the retainer 51 gets over the first engaging portion 383 of the fixing member 30, the elastic member 37 is restored to push the first engaging portion 383 back. The first engaging portion 383 engages a rear surface of the second engaging portion 513 to prevent the retainer 51 from moving outward. A rear end of the retainer 51 abuts against the tab 325 of the base 30. The elastic portions 3231 of the clasps 323 abut against corresponding lateral side of the retainer 51. The grip portion 510 of the retainer 51 is received in the cutout 310 of the base 30. The spring fingers 125 of the shielding plate 12 engage a top surface of the optical disc drive 53 for preventing EMI.

During moving of storage module 50 in the base 30, the elastic portions 3231 of the clasps 323 press the retainer 51 against the rail 321, and the rail 321 acts as a assembling datum plane. It will be understood that assembling precision of the storage module 50 in the base 30 is easily achieved by controlling manufacturing tolerance of the rail 321.

To detach the storage module 50, the sliding member 36 is slid to pull the fixing member 38 in the receptacle 341 of the base 30 away from the storage module 50. The first engaging portion 383 of the fixing member 38 is disengaged from the second engaging portion 383 of the retainer 51. The storage module 50 is ready to be removed from the base 30 by pulling at the grip portion 510 of the retainer 51.

It is believed that the present embodiment and its advantages will be understood from the foregoing description, and it will be apparent that various changes may be made thereto without departing from the spirit and scope of the invention or sacrificing all of its material advantages, the embodiment and examples hereinbefore described merely being one preferred or exemplary embodiment with exemplary detail.

What is claimed is:

1. An electronic apparatus comprising:
   a base, a rigid rail arranged to the base, a clasp directly fixed to the base facing the rail;
   a fixing member having a first engaging portion movable in the base in a first direction;
   a component movably received between the elastic portion and the rail in a second direction different from the first direction, the elastic portion abutting against the component;
   a second engaging portion arranged to the component, the first engaging portion of the fixing member disengageably engaging the second engaging portion;
   a sliding member engageable with the fixing member and movable in the first direction to drive the first engaging portion of the fixing member to disengage from the second engaging portion;
   a cover detachably attached to the base; and
   a shielding plate sandwiched between the component and the cover;
   wherein a cantilevered arcuate elastic portion extends along the second direction from an end edge of the clasp which is perpendicular to the base, and the elastic portion is spaced from the base; the shielding plate defines a pair of spaced slots, a pair of spaced longitudinal ribs depends from the cover to extend through the slots of the shielding plate and engage opposite lateral sides of the component.

2. The electronic apparatus as claimed in claim 1, wherein the second engaging portion protrudes from the component.

3. The electronic apparatus as claimed in claim 1, wherein a receptacle is formed on the base, the fixing member comprises a body movably received in the receptacle, and the first engaging portion is formed on the body.

4. The electronic apparatus as claimed in claim 3, wherein an elastic member is arranged in the receptacle to actuate the fixing member.

5. The electronic apparatus as claimed in claim 3, wherein a through hole is defined in the base, the sliding member comprise a pair of hooks extending through the through hole to engage with the body of the fixing member.

6. An electronic apparatus comprising:
   a base comprising a bottom surface, a rail arranged to the bottom surface, at least one clasp directly fixed to the bottom surface opposite to the rail, a cantilevered arcuate elastic portion extending along a direction parallel with the rail from an end edge of the clasp which is perpendicular to the bottom surface;
   a cover detachably attached to the base, the cover and the base cooperatively defining a receiving space;
   a component movably received between the rail and said clasp, the elastic portion urging the component to the rail; and
   a shielding plate sandwiched between the component and the cover, wherein the shielding plate defines a pair of spaced slots, a pair of spaced longitudinal ribs depends from the cover to extend through the slots of the shielding plate and engage opposite lateral sides of the component.

7. The electronic apparatus as claimed in claim 6, wherein the rail is generally L-shaped in construction.

8. The electronic apparatus as claimed in claim 6, wherein a tab is arranged on the bottom surface of the base to prevent the component further movement.

9. The electronic apparatus as claimed in claim 6, further comprising a fixing member having an engaging portion movable in the receiving space, wherein the engaging portion fixes the component in the base.

10. The electronic apparatus as claimed in claim 9, wherein a sliding member is attached to the fixing member and movable to drive the engaging portion of the fixing member to disengage from the component.

11. The electronic apparatus as claimed in claim 6, wherein the component comprises a retainer and a storage device retained in the retainer.

12. The electronic apparatus as claimed in claim 1, wherein at least one spring finger is punched downwardly from the shielding plate and configured for engaging the component.

13. The electronic apparatus as claimed in claim 6, wherein at least one spring finger is punched downwardly from the shielding plate and configured for engaging the component.

* * * * *